(12) United States Patent
Sridhara et al.

(10) Patent No.: US 8,693,740 B1
(45) Date of Patent: Apr. 8, 2014

(54) SYSTEM AND METHOD FOR FACE DETECTION IN DIGITAL IMAGES

(71) Applicant: Ittiam Systems (P) Ltd, Bangalore (IN)

(72) Inventors: Hamsalekha Sridhara, Bangalore (IN); Omkar Kedarnath Sastry, Natick, MA (US); Srinivasan Ekabaram, Bangalore (IN); Murali Babu Muthukrishnan, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 0 days.

(21) Appl. No.: 13/670,487

(22) Filed: Nov. 7, 2012

(51) Int. Cl.
*G06K 9/00* (2006.01)
(52) U.S. Cl.
CPC .................. *G06K 9/00288* (2013.01)
USPC ......................... 382/118; 382/115
(58) Field of Classification Search
CPC ....... H04N 1/60; G06K 9/06; G06K 9/00885; G06K 2009/00932; G06K 9/00228; G06K 9/00221; G06K 9/00288; G06K 9/00281; G06K 9/00248; G06K 9/00234; G06K 9/0026; G06K 9/006; A63F 13/00; G07C 9/00158; G07C 9/00087; G06F 21/32
USPC .......................... 382/115, 116, 117, 118, 124
See application file for complete search history.

(56) References Cited

U.S. PATENT DOCUMENTS

| | | | |
|---|---|---|---|
| 2006/0098867 A1* | 5/2006 | Gallagher | 382/167 |
| 2006/0257132 A1* | 11/2006 | Shiffer et al. | 396/158 |
| 2007/0036438 A1* | 2/2007 | Thakur | 382/190 |
| 2007/0154096 A1* | 7/2007 | Cao et al. | 382/190 |
| 2009/0136152 A1* | 5/2009 | Kameyama | 382/275 |
| 2013/0279802 A1* | 10/2013 | van der Merwe | 382/165 |

* cited by examiner

*Primary Examiner* — Edward Park
(74) *Attorney, Agent, or Firm* — Prakash Nama; Global IP Services, PLLC

(57) ABSTRACT

A method and architecture for face detection under varying light conditions, tilt levels, different color characteristics of faces in a digital image are disclosed. In one embodiment, skin pixels in the digital image are selected. Any unselected pixels are then classified into bright pixels and dark pixels. Skin pixels are then selected from the bright pixels. Skin pixels are further selected from the dark pixels. All the skin pixels are then grouped into windows. Any window having skin pixels that is more than or equal to a predetermined number of skin pixels is then declared as a skin window. Candidate face regions are then formed by grouping the skin windows. Boundaries of candidate face regions are then determined. Eye regions are then determined in the boundaries of candidate face regions. Each candidate face region is then declared as a face, if the eye regions are determined in it.

30 Claims, 10 Drawing Sheets

SYSTEM AND METHOD FOR FACE DETECTION IN DIGITAL IMAGES

TECHNICAL FIELD

Embodiments of the present subject matter relate to digital image processing. More particularly, embodiments of the present subject matter relate to system and method for robust face detection using digital image processing.

BACKGROUND

In recent years, human face detection is becoming more and more important in various applications, such as video surveillance, human computer interface, face recognition, and face image database management. In face recognition application, the human face location must be known before the image processing. Face tracking application also needs a predefined face location first. In face image database management, the human faces must be discovered as fast as possible due to the large image database. Although, numerous existing techniques are used for face detection, they suffer either from poor detection rates due to presence of tilts and brightness variations or from high processing needs that make real time face detection unrealistic on embedded devices.

BRIEF DESCRIPTION OF THE DRAWINGS

Various embodiments are described herein with reference to the drawings, wherein.

The systems and methods disclosed herein may be implemented in any means for achieving various aspects. Other features will be apparent from the accompanying drawings and from the detailed description that follow.

DETAILED DESCRIPTION

System and method for face detection in a digital image are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
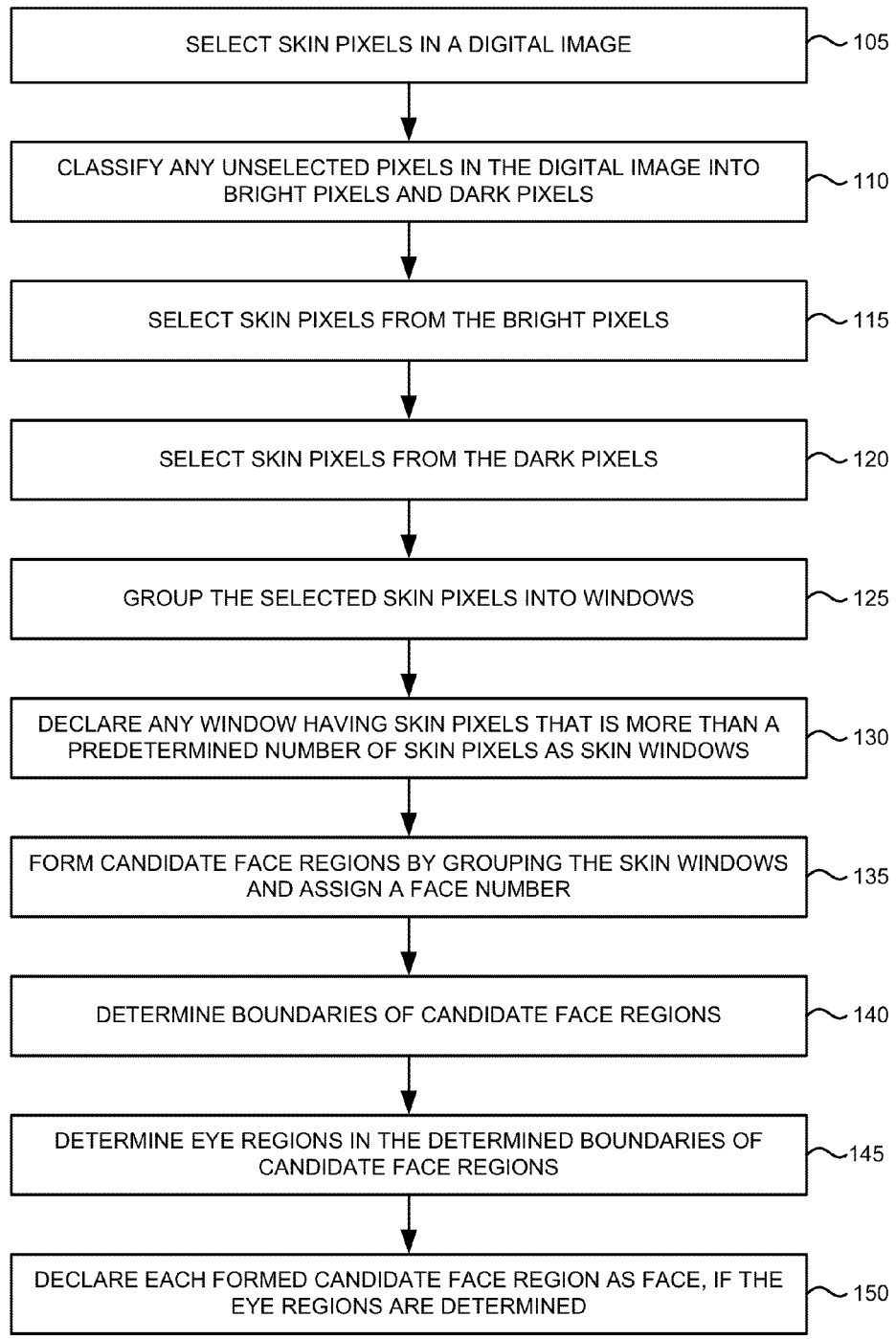
FIG. 1 illustrates a flowchart of a method for face detection, according to one embodiment.

FIG. 1 illustrates a flowchart 100 describing the steps involved for face detection in digital images, according to one embodiment. At block 105, skin pixels in the digital image are selected based on a first set of predetermined threshold value ranges for U and V chrominance value ranges in YUV space and a second set of predetermined threshold value ranges for normalized R and normalized G in RGB space and H, S and V in HSV space. In one embodiment, the first set of predetermined U and V chrominance value ranges in YUV space are about 67 to 128 and 134 to 193, respectively. In one embodiment, the second set of predetermined threshold value ranges for normalized R and normalized G values are about 38 to 55 and 25 to 38, respectively, and for H is about 0 to 50 and 340 to 360, S is greater than 0.2 and V is greater than 0.35.

At block 110, any unselected pixels in the digital image are classified into bright pixels and dark pixels using thresholds on luminance value Y of each pixel. In one embodiment, the thresholds on luminance value Y of each pixel are approximately greater than or equal to 150 for bright pixels and less than or equal to 60 for dark pixels.

At block 115, skin pixels from the bright pixels are selected based on a third set of threshold normalized R, normalized G values, and H, S, and V values. In one embodiment, the third set of threshold for normalized R is about 32 to 55, normalized G values are about 25 to 38, H is about 0 to 50 and 340 to 360, S is greater than 0.1, and V is greater than 0.35.

Figure 4:
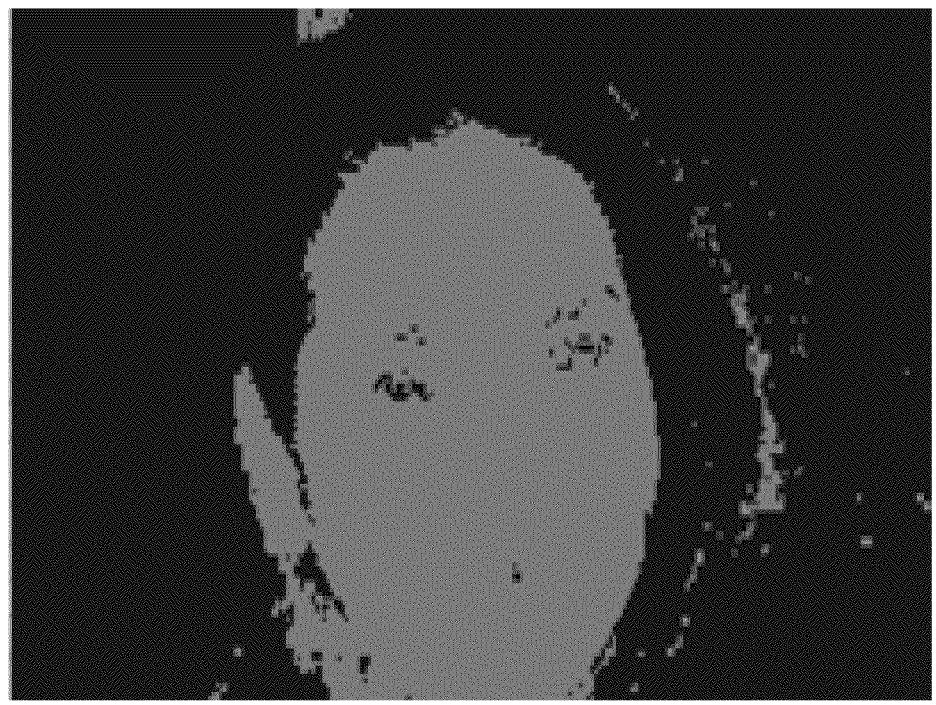
FIG. 4 illustrates an image obtained after performing skin detection to the digital image, as shown in FIGS. 1 and 2, according to one embodiment.

At block 120, skin pixels from the dark pixels are selected based on a fourth set of threshold normalized R, normalized G values, and H, S, and V values (see FIG. 4). In one embodiment, the fourth set of threshold normalized R is 38 to 55, normalized G values is 25 to 38, H is 0 to 50 and 340 to 360, S is greater than 0.2, and V is greater than 0.25.

Figure 5:
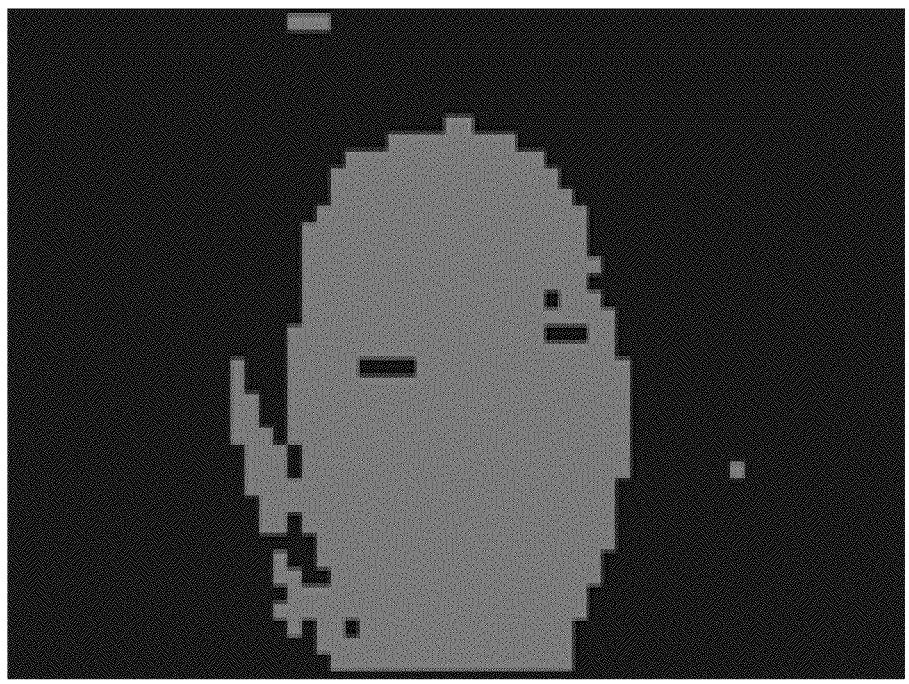
FIG. 5 illustrates an image obtained after breaking the image, such as the one shown in FIG. 4, into windows, according to one embodiment.

At block 125, all the selected skin pixels are grouped into windows of a predetermined window size of m×n. In one embodiment, the predetermined window size is 4×4 (see FIG. 5).

At block 130, any window having skin pixels that is more than or equal to a predetermined number of skin pixels is declared as a skin window. In one embodiment, the predetermined number of skin pixels is about 12 pixels.

Figure 6:
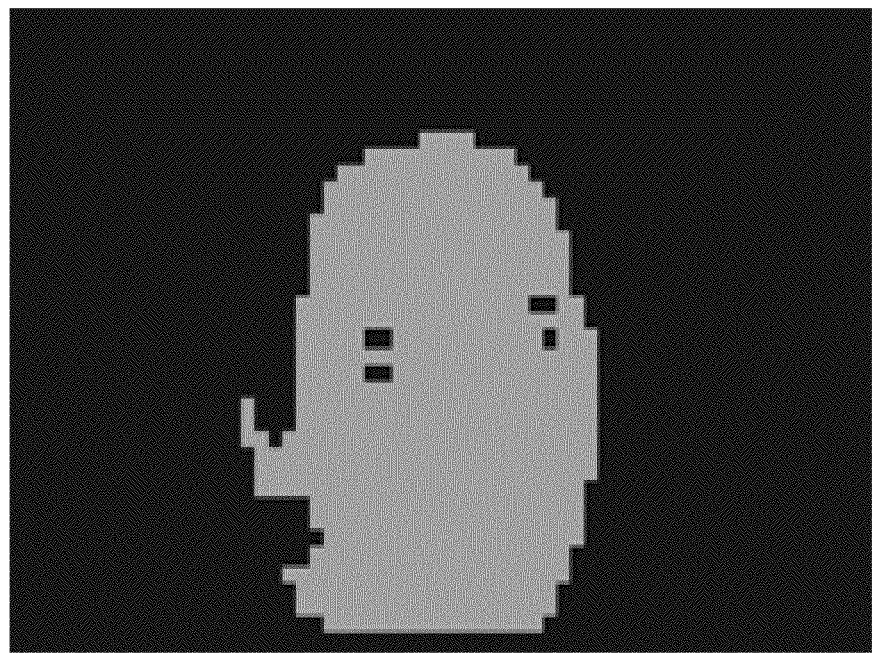
FIG. 6 illustrates an image obtained after grouping connected skin regions, such as those shown in FIG. 5, according to one embodiment.

At block 135, candidate face regions are formed by grouping the skin windows and assigning a face number derived from face number of neighboring skin windows (see FIG. 6). In one embodiment, the face number is derived by scanning skin windows in a raster scan order from top left to bottom right. If the number of neighbor windows classified as skin windows is greater than or equal to a predetermined threshold, then assigning the face number, wherein the face number is a minimum face number of its neighboring skin windows. In one embodiment the predetermined threshold is 6. Further, scanning the neighboring skin windows in a reverse raster scan order from bottom right to top left, and assigning the face number as the minimum face number of its neighboring skin windows.

At block 140, boundaries of candidate face regions are determined by determining a face boundary in x, y space based on assigned face numbers with the formed candidate face regions. In one embodiment, a face boundary in x, y space for each face number is determined by finding a set of minimum and maximum x values within a determined minimum and maximum y values.

Figure 7:
FIG. 7 illustrates an image obtained after performing eye mapping to the image, such as the one shown in FIG. 6, according to one embodiment.
Figure 8:
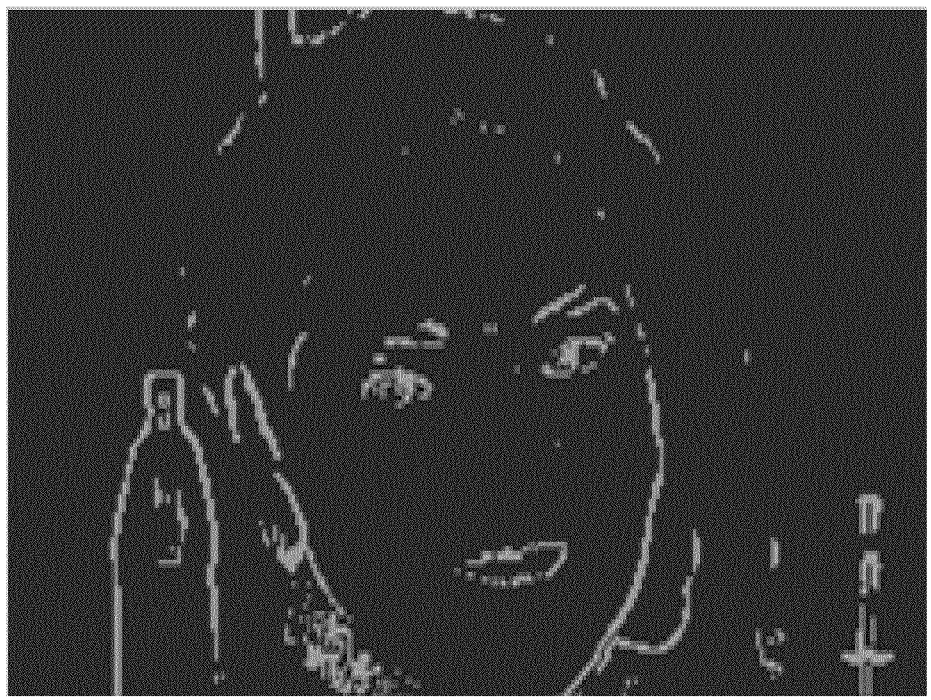
FIG. 8 illustrates an image obtained after performing edge mapping to the image, such as the one shown in FIG. 7, according to one embodiment.
Figure 9:
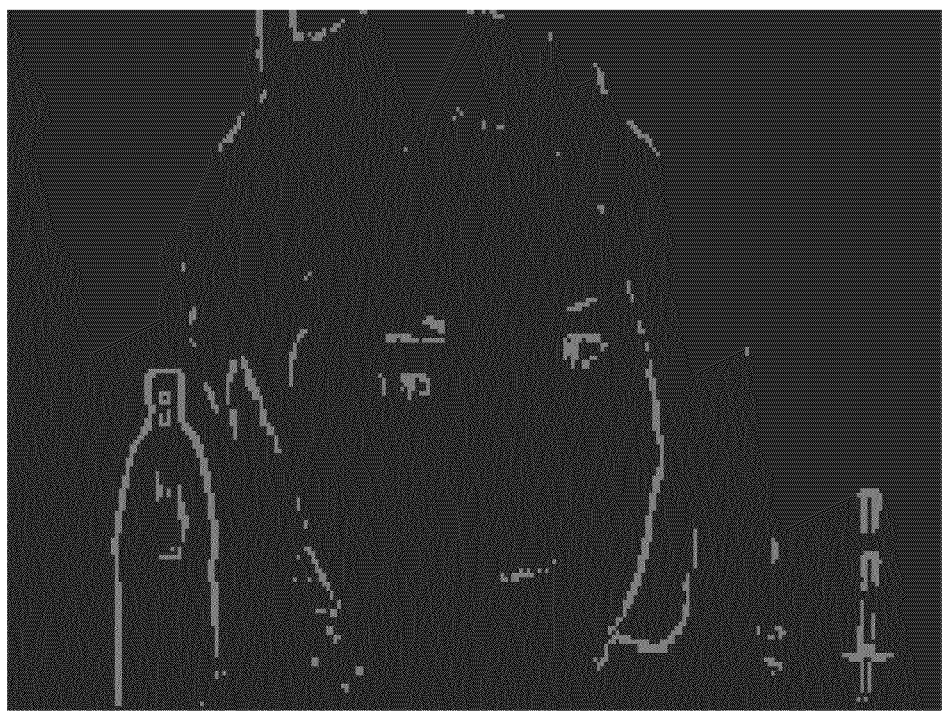
FIG. 9 illustrates an image obtained after performing intersection of the images, such as those shown in FIGS. 7 and 8, according to one embodiment.

At block 145, eye regions in the determined boundaries of candidate face regions are determined using a combination of edge detection, an eye mapping and continuity in windows containing eye pixels (see FIG. 9). The eye pixels are pixels which exceed the edge detection and eye mapping thresholds. In one embodiment, the detection is performed by determining the edge pixels by using a 4 directional edge detector which checks for horizontal, vertical and 2 diagonal edges directions (see FIG. 8). In one embodiment, eye mapping includes performing eye map analysis on the determined edge pixels to determine candidate eye pixels (see FIG. 7). In one embodiment, the continuity process includes determining a continuous set of windows containing eye pixels when traversed in the x direction and declaring them as eye regions. In some embodiments, mid points of eye regions (X', Y') where X' is median of the x range (longest continuous set of windows containing a greater than a threshold number of eye pixels) and Y' is y location where the horizontal line of windows where the eye pixel count is maximum are determined.

Figure 10:
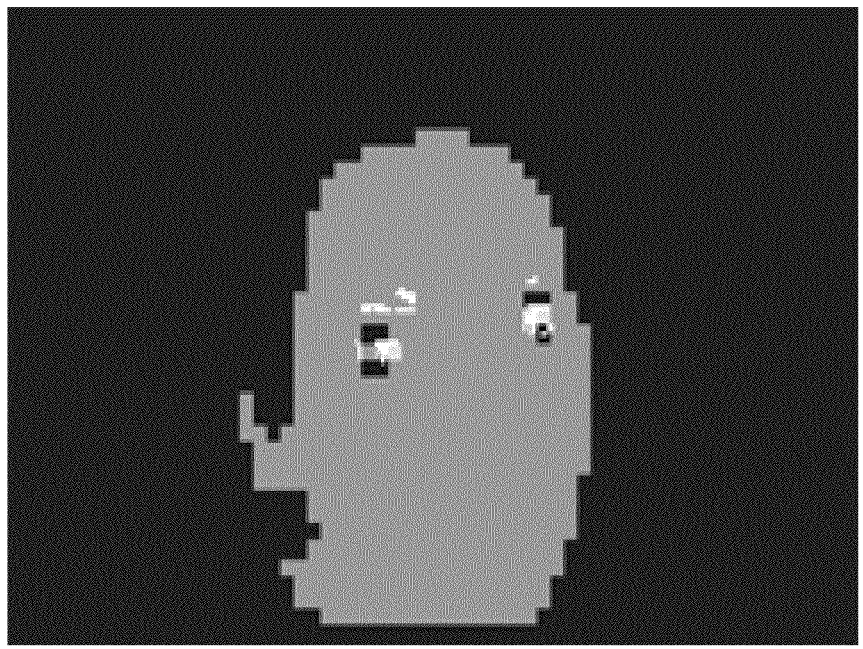
FIG. 10 illustrates an image obtained after identifying eyes in the image, such as the one shown in FIG. 9, according to one embodiment.

At block 150, each formed candidate face region is declared as face, if the eye regions are determined in the formed candidate face region (see FIG. 10). In some embodiments, any candidate face regions having 2 eye regions are declared as a face.

Figure 2:
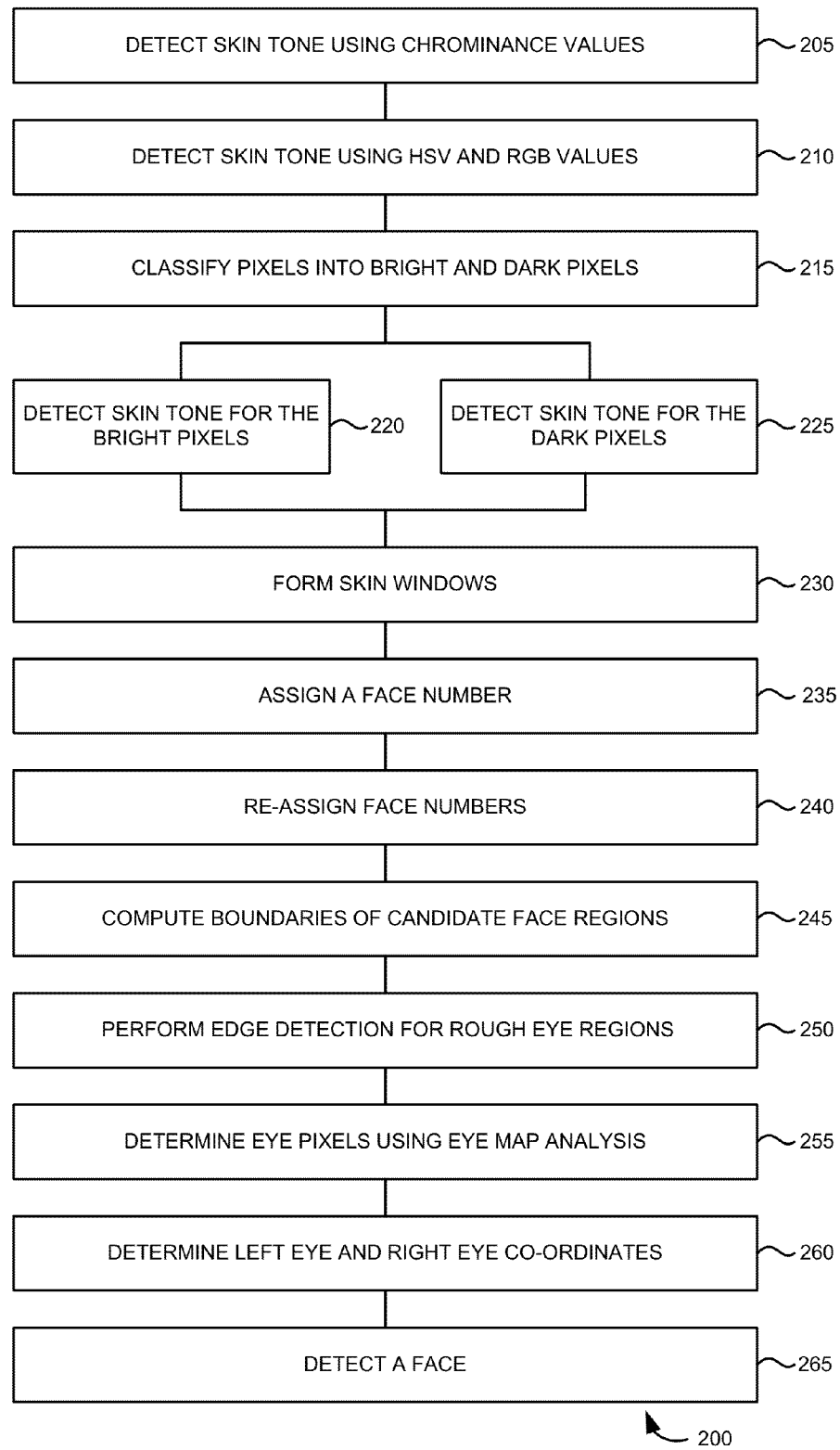
FIG. 2 illustrates another flowchart of a method for face detection, according to one embodiment.

FIG. 2 illustrates another flowchart 200 describing the steps involved for face detection in digital images, according to another embodiment. At block 205, skin tone in an image is detected using chrominance values. Skin tone detection includes detecting skin pixels in the image. In one embodiment, pixels having U and V values in a certain range are qualified as skin pixels. Further in this embodiment, if U is in the range u1<=U<=u2 and V is the range v1<=V<=v2, then the pixel is qualified as skin pixel. In these embodiments, u1=67, u2=128, v1=134, and v2=193.

At block 210, skin tone is further detected using HSV and RGB values. Pixels that qualified as skin pixels in the previous step are further classified as skin pixels, if their HSV and normalized RGB values are in a certain range. In one embodiment, the HSV and normalized RGB are if H is in the range h1<=H<=h2 or h3<=H<=h4, S>s1 and V>v1, r is in the range r1<=r<=r2, and g is in the range g1<=g<=g2, and h1=0, h2=50, h3=340, h4=360, s1=0.2 and v1=0.35, and r and g are normalized values defined as r=(R*100)/(R+G+B), g=(G*100)/(R+G+B) and r1=38, r2=55, g1=25, g2=38.

At block 215, any pixels in the image that were not classified as skin pixels are classified as bright pixels and dark pixels using their luminance value Y. In one embodiment, a pixel is classified as bright if Y>=y1, classified as a dark pixel if Y<=y2. In this embodiment, y1=150 and y2=60.

At block 220, skin tone detection is performed for the classified bright pixels with a second set of HSV and RGB thresholds. In one embodiment, the HSV and normalized RGB thresholds are r1=32, r2=55, g1=25 and g2=38 and h1=0, h2=50, h3=340, h4=360, s1=0.1 and v1=0.35.

At block 225, skin tone detection is performed for the classified dark pixels with a third set of HSV and RGB thresholds. In one embodiment, the HSV and normalized RGB thresholds are r1=38, r2=55, g1=25 and g2=38 and h1=0, h2=50, h3=340, h4=360, s1=0.2 and v1=0.25.

At block 230, skin windows of size m×n are formed using all selected skin pixels in the blocks 205-225. In one embodiment, windows are of size 4×4. Further at block 230, any formed windows having a minimum of 12 skin pixels out of 16 pixels are classified as skin window.

At block 235, a face number is assigned based on deriving face number from neighboring skin windows. In one embodiment, face number is assigned by first scanning all skin windows in a raster scan order (starting from top left of the image and proceeding to bottom right). For every 4×4 skin window, if at least a predetermined number of 8 neighbor windows are skin windows, then the current skin window is assigned a face number. In one embodiment the predetermined number is 6. Face number is assigned as the minimum face number of its 4 neighbor skin windows including its left, top left, top and top right neighbors. If none of its neighbors has a face number assigned, then it is given a new face number.

At block 240, face numbers are re-assigned to the skin windows having face numbers. In one embodiment, the face numbers are re-assigned by scanning the image in a reverse raster scan order, bottom right to top left. For each skin window having an assigned face number, a face number is re-assigned based on determining a minimum of its current face number and 4 other neighbors including right, bottom right, bottom and bottom left skin windows.

At block 245, boundaries of candidate face regions are computed. In one embodiment, all skin windows with the same face number are considered part of a candidate face. Boundaries of each such candidate face is defined as a range of (x, y) co-ordinates, ymin<=y<=ymax and each y in the range is associated with a range of x co-ordinates, xmin[y]<=x<=xmax[y]. Wherein, ymin of a face candidate is defined as the minimum y co-ordinate of all its constituent skin windows and ymax of a face candidate is defined as the maximum y co-ordinate of all its constituent skin windows. For each y in the range ymin<=y<=ymax, xmin[y] of a candidate face is defined as minimum x-coordinate of all its constituent skin windows with y co-ordinate equal to y. Further, for each y in the range ymin<=y<=ymax, xmax[y] of a candidate face is defined as maximum x-coordinate of all its constituent skin windows for a y co-ordinate.

At block 250, edge detection for rough eye regions are performed for each of the candidate faces. In one embodiment, edge detection for rough eye regions are performed on a top 50% of the face with y co-ordinates in the range, ymin<=y<=(ymin+ymax)/2. A four directional edge detection which checks for horizontal, vertical and two diagonal edges are then performed to determine the edge pixels. The threshold for edge detection is derived from histogram of luminance values across the image.

In this embodiment, edge threshold=1.5*(th2−th1), where th1 is a luminance Y (of YUV space) value at which the histogram covers the 0-10% of the area under histogram and th2 is a luminance Y (of YUV space) value at which the histogram covers 90% of the area under histogram.

At block 255, eye pixels are determined using eye map analysis. In one embodiment, eye pixels are determined by doing an eye map analysis on pixels which are classified as edge pixels in the above step using the equation:

$$\text{eye\_map} = 0.33 * ((U*U) + ((255-V)*(255-V)) + (U/V)),$$
where $U$ and $V$ are chrominance values of classified edge pixels Any edge pixels that exceed a threshold are classified as eye pixels. In example embodiment, an edge pixel is classified as eye pixel if its eye_map>=eye_th, where eye_th=8500.

At block 260, left eye and right eye coordinates are determined. In one embodiment, the left eye and right eye coordinates are determined by first searching for eyes only in the top 50% of the face. A window of 4×4 is chosen and number of eye pixels in each 4×4 window is computed. The co-ordinates of left and right eyes are computed separately and independently using the computed number of eye pixels in each 4×4 window. Then a search for left eye is performed in the left half of the face with range ymin<=y<=(ymin+ymax)/2, and for each y in the range, where x ranges from xmin[y]<=x<= (xmin(y)+xmax(y))/2. Similarly, the search for the right eye is performed in the right half of the face with range ymin<=y<=(ymin+ymax)/2, and for each yin the range, where x ranges from (xmin(y)+xmax(y))/2<=x<=xmax(y). The y co-ordinate of the eye is determined by considering horizontal rows of 4×4 windows. The number of eye pixels in each horizontal row is determined. The horizontal row which has maximum number of eye pixels is chosen as the y co-ordinate. This is done for left and right eyes independently. Then vertical columns of 4×4 windows are used to determine the number of eye pixels in each column of 4×4 windows. We also determine the maximum number of eye pixels that are present in any column. Then the vertical columns of 4×4 windows for which num_eye_pixels>=0.1*max_eye_pixels are determined, Wherein num_eye_pixels is the number of eye pixels in vertical column and max_eye_pixels is the maximum number of eye pixels that are present in a column. Then the longest group of consecutive columns for which the above condition is true is determined. The median of x-coordinates of that group is used as the x co-ordinate of the eye. This is done for the left eye and right eye independently in the left and right half of the face.

At block 265, a face in the digital image is declared as detected if the candidate face has both the left and right eye identified based on the above determined left eye and the right eye coordinates.

Figure 3:
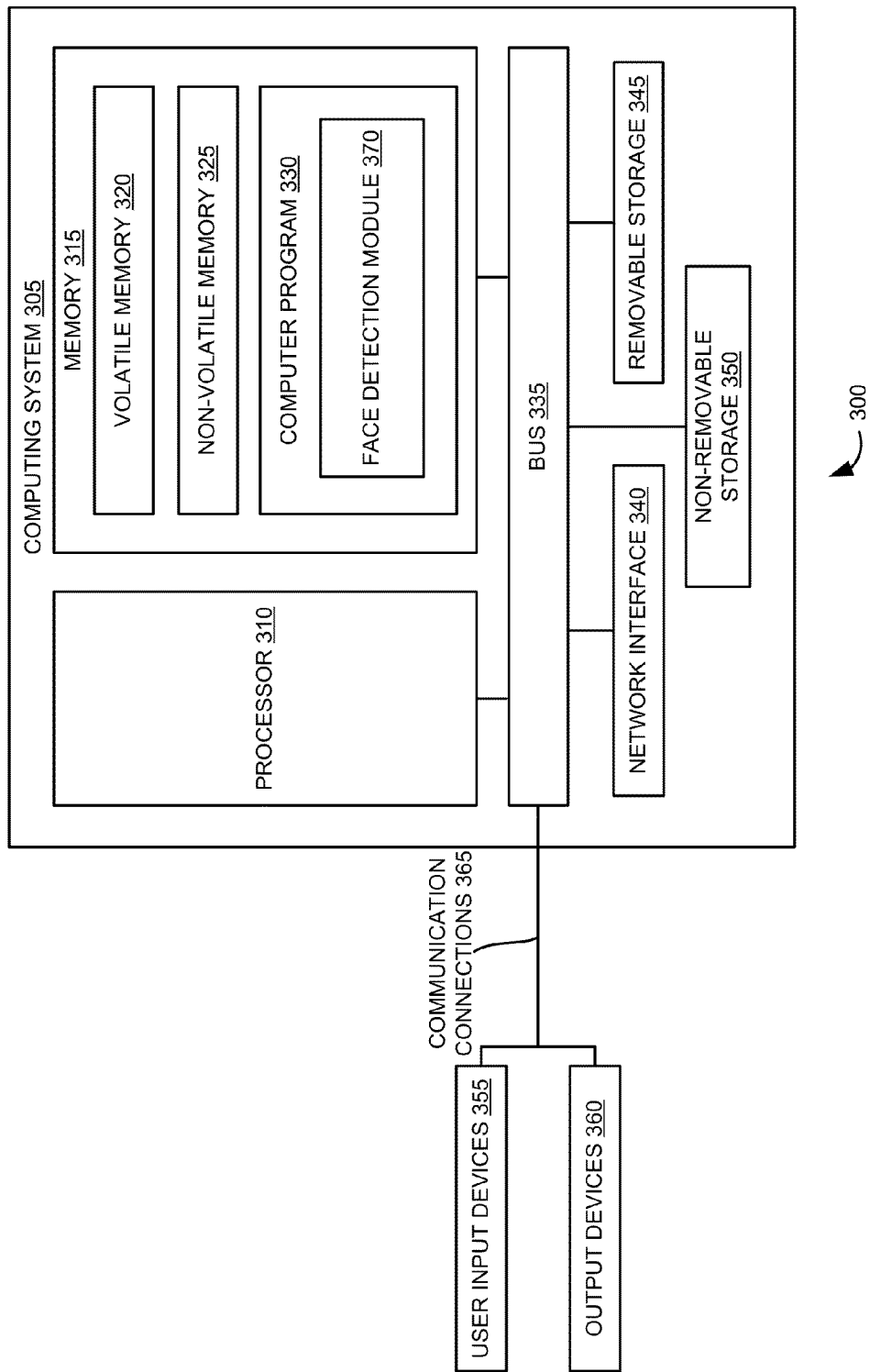
FIG. 3 illustrates a block diagram of a face detection system, such as shown in FIGS. 1 and 2, according to one embodiment.

FIG. 3 illustrates a block diagram of a face detection system 300, such as shown in FIGS. 1 and 2, according to one embodiment of this disclosure. As shown in FIG. 3, the face detection system includes a computing system 305 including a face detection module 370 for face detection in digital images, using the process described with reference to FIGS. 1 and 2, according to one embodiment. FIG. 3 and the following discussions are intended to provide a brief, general description of a suitable computing environment in which certain embodiments of the inventive concepts contained herein are implemented.

The computing system 305 includes a processor 310, memory 315, a volatile memory 320, and a non-volatile memory 325. The computing system 305 additionally includes a bus 335 and a network interface 340. As shown in FIG. 3, the computing system 305 includes access to the computing system environment 300 that includes one or more user input devices 355, one or more output devices 360, and one or more communication connections 365, such as a network interface card and/or a universal serial bus connection.

Exemplary user input devices 355 include a digitizer screen, a stylus, a trackball, a keyboard, a keypad, a mouse and the like. Exemplary output devices 360 include a display unit of the personal computer, a mobile device, the FMS, and the like. Exemplary communication connections 365 include a local area network, a wide area network, and/or other network.

As shown in FIG. 3, memory 315 further includes volatile memory 320 and non-volatile memory 325. A variety of computer-readable storage media are stored in and accessed from the memory elements of the computing system 305, such as the volatile memory 320 and the non-volatile memory 325, the removable storage 345 and the non-removable storage 350. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 310, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 310 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 310 of the computing system 305. For example, a computer program 330 includes machine-readable instructions capable of performing face detection in the computing system 310, according to the teachings and herein described embodiments of the present subject matter. In one embodiment, the computer program 330 is included on a compact disk-read only memory (CD-ROM) and loaded from the CD-ROM to a hard drive in the non-volatile memory 325. The machine-readable instructions cause the computing system 305 to carry out the face detection in digital images according to the various embodiments of the present subject matter.

As shown, the computer program 330 includes the face detection module 370. For example, the face detection module can be in the form of instructions stored on a non-transitory computer-readable storage medium. The non-transitory computer-readable storage medium having the instructions that, when executed by the computing system 305, causes the computing system 305 to perform the one or more methods described in FIGS. 1 through 2.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a computer system and may be performed in any order (e.g., including using means for achieving the various operations). Accordingly, the specification and drawings are to be regarded in an illustrative rather than a restrictive sense.

In various embodiments, systems and methods described with reference to FIGS. 1 through 10 propose a robust face detection algorithm. Further, the face detection algorithm has a higher accuracy level in detecting faces under varying light conditions, tilt levels, different color characteristics of faces. Furthermore, the above proposed face detection algorithm is computationally less intensive and can be easily ported to an embedded device. In addition, the above proposed face detection algorithm uses skin tone detection and detection of eyes inside a skin region to increase the accuracy of detection of a face and also has the ability to detect multiple faces in a single digital image. Also, the face detection algorithm works effectively for different skin tones and tilted faces as well.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for face detection in a digital image, comprising:
    selecting skin pixels in the digital image based on a first set of predetermined threshold value ranges for U and V chrominance value ranges in YUV space and a second set of predetermined threshold value ranges for normalized R and normalized G in RGB space and H, S and V in HSV space;
    classifying any unselected pixels in the digital image into bright pixels and dark pixels using thresholds on luminance value Y of each pixel;
    selecting skin pixels from the bright pixels based on a third set of threshold normalized R, normalized G values, and H, S, and V values;
    selecting skin pixels from the dark pixels based on a fourth set of threshold normalized R, normalized G values, and H, S, and V values;
    grouping all the selected skin pixels into windows of a predetermined window size of m×n;
    declaring any window having skin pixels that is more than or equal to a predetermined number of skin pixels as a skin window;
    forming candidate face regions by grouping the skin windows and assigning a face number derived from face number of neighboring skin windows;
    determining boundaries of candidate face regions by determining a face boundary in x, y space based on assigned face numbers with the formed candidate face regions;
    determining eye regions in the determined boundaries of candidate face regions using a combination of edge detection, an eye map and continuity in windows containing eye pixels, wherein the eye pixels are pixels which exceed the edge detection and eye mapping thresholds; and
    declaring each formed candidate face region as face, if the eye regions are determined in the formed candidate face region.

2. The method of claim 1, wherein the first set of predetermined U and V chrominance value ranges in YUV space are about 67 to 128 and 134 to 193, respectively.

3. The method of claim 1, wherein the predetermined threshold value ranges for normalized R and normalized G are about 38 to 55 and 25 to 38 and for H is about 0 to 50 and 340 to 360, S is greater than 0.2 and V is greater than 0.35.

4. The method of claim 1, wherein the thresholds on luminance value Y of each pixel are approximately greater than or equal to 150 for bright pixels and less than or equal to 60 for dark pixels.

5. The method of claim 1, wherein the third set of threshold normalized R and normalized G values are about 32 to 55 and 25 to 38, and for H is about 0 to 50 and 340 to 360, S is greater than 0.1, and V values are greater than 0.35.

6. The method of claim 1, wherein the fourth set of threshold normalized R and normalized G values are about 38 to 55 and 25 to 38, and for H is about 0 to 50, 340 to 360, S is greater than 0.2, and V values are greater than 0.25.

7. The method of claim 1, wherein the predetermined window size of m×n is a predetermined window size of 4×4.

8. The method of claim 1, wherein the predetermined number of skin pixels is about 12 pixels.

9. The method of claim 8, wherein assigning the face number derived from a predetermined number of neighboring skin windows comprises:
    scanning for skin windows in a raster scan order from top left to bottom right;
    if at least predetermined number of windows out of 8 neighbor windows are skin windows, then assigning the face number, wherein the predetermined number is 6 and the face number is a minimum face number of its neighboring skin windows;
    scanning for the neighboring skin windows in a reverse raster scan order from bottom right to top left; and
    assigning the face number as the minimum face number of its neighboring skin windows.

10. The method of claim 1, wherein determining a face boundary in x, y space based on assigned face numbers with the formed candidate face regions, comprises:
    determining a face boundary in x, y space for each face number by finding a set of minimum and maximum x values within a determined minimum and maximum y values.

11. The method of claim 1, wherein determining the eye regions in the determined boundaries of candidate face regions using a combination of edge detection, an eye map and continuity in windows containing eye pixels comprises:
    determining the edge pixels by using a 4 directional edge detector which checks for horizontal, vertical and 2 diagonal edges directions;
    performing eye map analysis on the determined edge pixels to determine candidate eye pixels; and
    declaring as eye regions upon determining a continuous set of windows containing eye pixels, when traversed in the x direction.

12. The method of claim 11, further comprising:
    determining mid points of eye regions (X', Y') where X' is median of the x range which is a longest continuous set of windows containing a greater than a threshold number of eye pixels and Y' is y location where the horizontal line of windows where the eye pixel count is maximum.

13. The method of claim 11, further comprising:
    declaring as face any candidate face regions having 2 eye regions.

14. A face detection system, comprising:
    processor; and
    memory operatively coupled to the processor, wherein the memory having disposed in it a face detection module having computer instructions capable of:
        selecting skin pixels in the digital image based on a first set of predetermined threshold value ranges for U and V chrominance value ranges in YUV space and a second set of predetermined threshold value ranges for normalized R and normalized G in RGB space and H, S and V in HSV space;

classifying any unselected pixels in the digital image into bright pixels and dark pixels using thresholds on luminance value Y of each pixel;

selecting skin pixels from the bright pixels based on a third set of threshold normalized R and normalized G values, and H, S, and V values;

selecting skin pixels from the dark pixels based on a fourth set of threshold normalized R and normalized G values, and H, S, and V values;

grouping the selected skin pixels into windows of a predetermined window size of m×n;

declaring any window having skin pixels that is more than or equal to a predetermined number of skin pixels as a skin window;

forming candidate face regions by grouping the skin windows and assigning a face number derived from face number of neighboring skin windows;

determining boundaries of candidate face regions by determining a face boundary in x, y space based on assigned face numbers with the formed candidate face regions;

determining eye regions in the determined boundaries of candidate face regions using a combination of edge detection, an eye map and continuity in windows containing eye pixels, wherein the eye pixels are pixels which exceed the edge detection and eye map thresholds; and declaring each formed candidate face region as face, if the eye regions are determined in the formed candidate face region.

15. The system of claim 14, wherein the first predetermined U and V chrominance value ranges in YUV space are about 67 to 128 and 134 to 193, respectively.

16. The system of claim 14, wherein the predetermined threshold value ranges for normalized R and normalized G are about 38 to 55 and 25 to 38, respectively, and for H is about 0 to 50 and 340 to 360, S is greater than 0.2 and V is greater than 0.35.

17. The system of claim 14, wherein the thresholds on luminance value Y of each pixel are approximately greater than or equal to 150 for bright pixels and less than or equal to 60 for dark pixels.

18. The system of claim 14, wherein the third set of threshold normalized R and normalized G values are about 32 to 55 and 25 to 38, respectively, and for H is about 0 to 50 and 340 to 360, S is greater than 0.1 and V values are greater than 0.35.

19. The system of claim 14, wherein the fourth set of threshold normalized R and normalized G values are about 38 to 55 and 25 to 38, respectively, and for H is about 0 to 50, 340 to 360, S is greater than 0.2, and V values are greater than 0.25.

20. The system of claim 14, wherein the predetermined window size of m×n is a predetermined window size of 4×4.

21. The system of claim 14, wherein the predetermined number of skin pixels is about 12 pixels.

22. The system of claim 21, wherein assigning the face number derived from a predetermined number of neighboring skin windows comprises:

scanning for skin windows in a raster scan order from top left to bottom right;

if at least a predetermined number of windows out of 8 neighbor windows are skin windows, then assigning the face number, wherein the predetermined number is 6 and the face number is a minimum face number of its neighboring skin windows;

scanning for the neighboring skin windows in a reverse raster scan order from bottom right to top left; and assigning the face number as the minimum face number of its neighboring skin windows.

23. The system of claim 14, further comprising:

determining a face boundary in x, y space for each face number by finding a set of minimum and maximum x values within a determined minimum and maximum y values.

24. The system of claim 14, wherein determining the eye regions in the determined boundaries of candidate face regions using a combination of edge detection, an eye map and continuity windows containing eye pixels comprises:

determining the edge pixels by using a 4 directional edge detector which checks for horizontal, vertical and 2 diagonal edges directions;

performing eye map analysis on the determined edge pixels to determine candidate eye pixels; and declaring as eye regions upon determining the continuous set of windows containing eye pixels, when traversed in the x direction.

25. The system of claim 24, further comprising:

determining mid points of eye regions (X', Y') where X' is median of the x range which is a longest continuous set of windows containing a greater than a threshold number of eye pixels and Y' is y location where the horizontal line of windows where the eye pixel count is maximum.

26. The system of claim 24, further comprising:

declaring as face any candidate face regions having 2 eye regions.

27. A non-transitory computer-readable storage medium for face detection in a face detection system, when executed by a computing device, cause the computing device to:

select skin pixels in the digital image based on a first set of predetermined threshold value ranges for U and V chrominance value ranges in YUV space and a second set of predetermined threshold value ranges for normalized R and normalized G in RGB space and H, S and V in HSV space;

classify any unselected pixels in the digital image into bright pixels and dark pixels using thresholds on luminance value Y of each pixel;

select skin pixels from the bright pixels based on a third set of threshold normalized R, normalized G values, and H, S, and V values;

select skin pixels from the dark pixels based on a fourth set of threshold normalized R, normalized G values, and H, S, and V values;

group the selected skin pixels into windows of a predetermined window size of m×n;

declare any window having skin pixels that is more than or equal to a predetermined number of skin pixels as a skin window;

form candidate face regions by grouping the skin windows and assigning a face number derived from face number of neighboring skin windows;

determine boundaries of candidate face regions by determining a face boundary in x, y space based on assigned face numbers with the formed candidate face regions;

determine eye regions in the determined boundaries of candidate face regions using a combination of edge detection, an eye map and continuity in windows containing eye pixels, wherein the eye pixels are pixels which exceed the eye map and edge detection thresholds; and declare each formed candidate face region as face, if the eye regions are determined in the formed candidate face region.

28. The non-transitory computer-readable storage medium of claim 27, wherein assigning the face number derived from a predetermined number of neighboring skin windows comprises:

scanning for skin windows in a raster scan order from top left to bottom right;

if at least a predetermined number of windows out of 8 neighbor windows are skin windows, then assigning the face number, wherein the predetermined number is 6 and the face number is a minimum face number of its neighboring skin windows;

scanning for the neighboring skin windows in a reverse raster scan order from bottom right to top left; and assigning the face number as the minimum face number of its neighboring skin windows.

29. The non-transitory computer-readable storage medium of claim 27, further comprising:

determining a face boundary in x, y space for each face number by finding a set of minimum and maximum x values within a determined minimum and maximum y values.

30. The non-transitory computer-readable storage medium of claim 27, wherein determining the eye regions in the determined boundaries of candidate face regions using a combination of edge detection, an eye map and continuity in windows containing eye pixels comprises:

determining the edge pixels by using a 4 directional edge detector which checks for horizontal, vertical and 2 diagonal edges directions;

performing eye map analysis on the determined edge pixels to determine candidate eye pixels; and declaring as eye regions upon determining the continuous set of windows containing eye pixels, when traversed in the x direction.

* * * * *